Aug. 5, 1969 C. P. KRAUS 3,459,968
DIODE SWITCH
Filed May 26, 1966
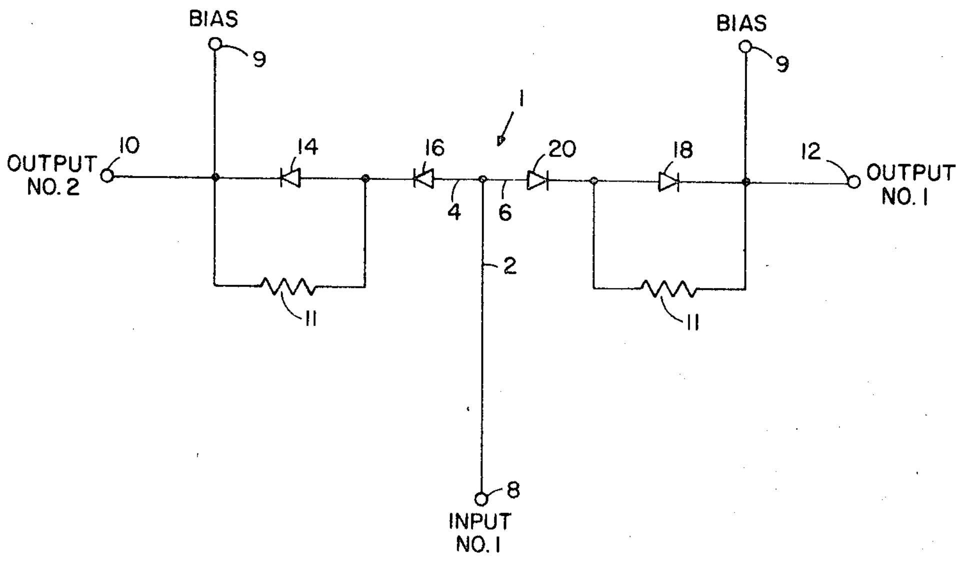
Charles P. Kraus,
INVENTOR.
Harry M. Saragovitz
BY Edward J. Kelly
Herbert Berl
Alfred E. Smith 3,459,968
Patented Aug. 5, 1969

3,459,968
DIODE SWITCH

Charles P. Kraus, East Northport, N.Y., assignor, by mesne assignments, to the United States of America as represented by the Secretary of the Army Filed May 26, 1966, Ser. No. 553,611
Int. Cl. H03k *17/56*
U.S. Cl. 307—259 3 Claims

ABSTRACT OF THE DISCLOSURE

A single pole, double throw switch wherein pairs of diodes in the output arms of the switch are biased on and off to make circuit connections. One diode in each arm is shunted with a resistor thereby decreasing the loss in that particular arm when the diodes therein are biased off.

This invention relates to diode switches and particularly to an improvement over the state of the art wherein a pair of diodes are spaced one-quarter wave length apart in the center conductor of each of the two arms of a T junction, the other and third arm being the input conductor.

Previous use of this arrangement resulted in a low-loss diodes switch which had appreciable loss in the isolated arm.

It is, therefore, an object of this invention to provide a low-loss diode switch within which the loss in the isolated arm is typically reduced.

For a low-loss switch of this type, a considerable amount of the loss is dissipated in the diodes in the isolated arm. To decrease this undesired loss, for a given available reverse voltage, a resistor is placed across the second diode of each arm. By use of the resistor, the reverse bias is placed almost entirely on the diode closest to the junction. This improves the diode's characteristics and helps because of the fact that this diode affects the main loss of the diodes in this arm. The total loss of the switch will be typically reduced, if the insertion loss effect of the resistor in the conducting arm does not override this saving. Experimental data proves that the total loss does decrease. The inclusion of the resistor, therefore, insures that almost all of the reverse bias appears across the first diode, thus improving the action of the diode switch. The resistor is much greater than $Z_0$ (forward impedance) and much smaller than $R_L$ (leakage resistance) of the diode.

For a fuller understanding of the nature and objects of the invention, reference should be had to the following detailed description taken in connection with the single figure of the accompanying drawing which is a simplified schematic diagram of the present invention.

A single pole, double throw, diode switch using p-i-n diodes is shown in the accompanying drawing and comprises a T junction 1 having legs 2, 4 and 6. Leg 2 has an input terminal 8 connected thereto, the legs 4 and 6 are connected to output terminals 10 and 12, respectively. Leg 4 has a pair of series connected diodes 14 and 16 therein, and leg 6 has a pair of diodes 18 and 20 therein. A signal is fed into input No. 1 Bias 9 is applied to the diodes in legs 4 and 6 such that one path is favored; that is, they are forward biased such that the diodes approach a short circuit. In the other path, they are negatively biased and approach open circuits. A quarter-wave spacing between diodes may be used to enhance the isolation of the unfavored arm.

To appreciably reduce the loss in the unfavored arm, a resistor 11 is placed across the second diode of each arm. The placement of a resistor in shunt with the second diode causes almost the entire reverse bias to be placed on the first diode in the unfavored arm, this diode being responsible for the majority of the loss in the unfavored arm. The increase of the reverse bias of the first diode causes its characteristics to improve, thus decreasing the loss. There is, however, an increase in loss in the conducting arm due to the insertion loss effect of the resistor shunted across the second diode. Experimental data proves that the inserted loss in the conducting arm is less than the reduced loss in the isolated arm, thus the over-all loss of the switch is reduced.

What I claim is:

1. A low loss, single pole, double throw diode switch comprising: a T junction including an input arm and two output arms; a pair of diodes in each of said output arms; means for applying bias voltage to each of said diodes; and a resistor connected in shunt across one of said diodes in each arm, said shunted diodes being the diodes most remote from the T junction, said means for applying bias voltage being connected to the anodes of said shunted diodes.

2. A low loss, single pole, double throw diode switch as set forth in claim 1 wherein said resistor is much greater than the forward impedance and smaller than the leakage resistance of the diode.

3. A low loss, single pole, double throw diode switch as set forth in claim 1 wherein said pairs of diodes each comprise a first and second diode connected in series, said first diodes having their anodes connected to said T junction and their cathodes connected to respective anodes of said second diodes.

References Cited

UNITED STATES PATENTS

| | | | |
|---|---|---|---|
| 2,535,303 | 12/1950 | Lewis | 328—91 |
| 3,296,457 | 1/1967 | Robbins et al. | 307—259 |
| 3,373,298 | 3/1968 | Thomkins et al. | 307—256 |

ARTHUR GAUSS, Primary Examiner
B. P. DAVIS, Assistant Examiner

U.S. Cl. X.R.

307—244, 256